United States Patent [19]

Martinson

[11] 4,161,033
[45] Jul. 10, 1979

[54] CORRELATOR/CONVOLVER USING A SECOND SHIFT REGISTER TO ROTATE SAMPLE VALUES

[75] Inventor: Lloyd W. Martinson, Haddonfield, N.J.

[73] Assignee: RCA Corporation, New York, N.Y.

[21] Appl. No.: 863,233

[22] Filed: Dec. 22, 1977

[51] Int. Cl.$^2$ .............................................. G06F 15/34
[52] U.S. Cl. .................................... 364/728; 364/604;
364/824
[58] Field of Search ................ 364/604, 728, 824, 862

[56] References Cited

U.S. PATENT DOCUMENTS

| 3,670,151 | 6/1972 | Lindsay et al. | 364/824 |
| 3,831,013 | 8/1974 | Alsup et al. | 364/824 |
| 3,942,035 | 3/1976 | Buss | 264/862 |
| 3,980,873 | 9/1976 | Mattei | 364/728 |
| 3,987,292 | 10/1976 | Means | 364/604 |
| 3,997,973 | 12/1976 | Buss | 264/824 |
| 4,025,772 | 5/1977 | Constant | 364/728 |

FOREIGN PATENT DOCUMENTS

468247  5/1975  U.S.S.R. .................................... 364/728

OTHER PUBLICATIONS

Whatley et al.: Charge-Coupled Device Applications in Radar Signal Processings, NAECON-74 Record pp. 284-291.
Alsup et al.: Real Time Discrete Fourier Transforms Using Surface Acoustic Wave Devices, Proceedings IEEE Internat. Specialist Seminar on Component Performance and Systems: Application on Surface Acoustic Wave Devices, Aziewore Scotland, Sep. 1973 pp. 278-286.
Leon, et al.: Designers' Guide to Digital Filters, Part 4, Electronic Design News, Apr. 20, 1974 pp. 57-62.

*Primary Examiner*—Felix D. Gruber
*Attorney, Agent, or Firm*—H. Christoffersen; Samuel Cohen; Donald W. Phillion

[57] ABSTRACT

Circular correlator/convolver for discrete sample signals having a first shift register to receive the sample signals in series and a second shift register to receive the sample signals, in parallel, from the first register to circulate these signals in the second register, and once each shfit period, to apply the n signals it is storing to a group of n multipliers, Each multiplier receives also a second signal which serves as a second operand and is multiplied with the signal received from the second shift register. The correlated/convolved values are produced in response to the product signals generated by the multipliers during the time a following group of sample signals is being read into the first shift register. The design is suitable for implementing with charge-coupled devices on a single substrate.

2 Claims, 15 Drawing Figures

CORRELATOR/CONVOLVER USING A SECOND SHIFT REGISTER TO ROTATE SAMPLE VALUES

This invention relates to convolvers and correlators for processing discrete signals and especially to circular convolvers or correlators.

For continuous signal values, convolution is performed by solving the convolution integral:

$$x(t) * h(t) = \int_{-\infty}^{\infty} x(\tau) h(t - \tau) d\tau.$$
or,
$$x(t) * h(t) = \int_{-\infty}^{\infty} h(\tau) x(t - \tau) d\tau.$$

These formulas are especially useful for predicting a system output signal when $x(t)$ is the input signal function and $h(t)$ is the impulse response function.

Correlation is closely allied to convolution in form, i.e., $$R_{XY}(\tau) = \lim_{t_p \to \infty} \int_0^{t_p} x(t) y(t - \tau) dt.$$

where
$R_{XY}(\tau)$ = cross correlation function,
$t_p$ = period of interest,
$x(t)$ = a first signal, and
$y(t)$ = a second signal.

If $y(t)$ is replaced with $x(t)$, the function $R_{xx}(\tau)$, is called the autocorrelation function. Correlation is useful in detection of signals over noise and in decision theory.

If the signals are periodic with period T, then $$R_{xy}(\tau) = \frac{1}{T} \int_0^T x(t) y(t - \tau) dt.$$

Much practical signal processing uses sampling techniques because several signals can be multiplexed over a single channel or message path. Sampling is also used when the processing is to be performed digitally. An example of the latter is digital filtering. Sampling results in discrete signals to be processed whether the sampled signal is continuous or not. Discrete signals can be processed in either analog or digital form. The remainder of this description makes no distinction between the analog or digital forms; the remarks are applicable to both.

The convolution integral of continuous signals is converted to a summation for discrete signals. For example, $$x(n) * h(n) = \sum_{k=0}^{N-1} x(k) h(n - k)$$
or
$$x(n) * h(n) = \sum_{k=0}^{N-1} h(k) x(n - k)$$

where
$x(n) \equiv x(n\tau)$ = discrete value of $x(t)$ at sample time $n\tau$,
$h(n) \equiv h(n)\tau$ = discrete value of $h(t)$ at sample time $n\tau$,
$\tau$ = time interval between samples, and
$N$ = number of sample points Similarly, the correlation function for the discrete case is given by $$R_{xy}(k) = \frac{1}{N} \sum_{n=0}^{N-1} x(n) y(n - k).$$

As an example of the calculation involved, let $x(t)$ be represented by $A_i$ in the discrete case and $h(t)$ or $y(t)$ be represented by $B_i$. Assume that the signals are periodic and four samples per period are used ($N=4$). Thus for convolving, $$A(n) * B(n) = \sum_{k=0}^{3} A(k) B(n-k),$$
$$= A(0) B(n) + A(1) B(n-1) + A(2) B(n-2) + A(3) B(n-3)$$

Similarly, for correlating, $$R(k) = \sum_{n=0}^{3} A(n) B(n-k)$$
$$= A(0) B(-k) + A(1) B(1-k) + A(2) B(2-k) + A(3) B(3-k)$$

In both summations, n and k will have the values 0, 1, 2 and 3. Changing the zero indexing to one indexing, using subscript indexing, and noting that the indices are modulo-N because the signals are assumed periodic, the summations can be written for

| Convolution | Correlation |
|---|---|
| $n=0: A_1B_1 + A_2B_4 + A_3B_3 + A_4B_2;$ | $k=0: A_1B_1 + A_2B_2 + A_3B_3 + A_4B_4;$ |
| $n=1: A_1B_2 + A_2B_1 + A_3B_4 + A_4B_3;$ | $k=1: A_1B_4 + A_2B_1 + A_3B_2 + A_4B_3;$ |
| $n=2: A_1B_3 + A_2B_2 + A_3B_1 + A_4B_4;$ | $k=2\ A_1B_3 + A_2B_4 + A_3B_1 + A_4B_2;$ |
| $n=3: A_1B_4 + A_2B_3 + A_3B_2 + A_4B_1;$ | $k=3\ A_1B_2 + A_2B_3 + A_3B_4 + A_4B_1;$ |

From the above tabulations, it can be seen that both processes involve shifting one set of values past the other set and forming the sum of products for each shift. The difference between the two processes is that one set of values ($B_i$ in the example) is reversed in order before the process is started in the case of convolution. This comports with the representation of convolution as "mirror and slide". Therefore, a device that can perform correlation can be assumed to perform convolution if one set of values is reversed before being applied to the device. Conversely, a convolver can be used as a correlator by reversing one set of input values.

Based on a generalization of the above tabulations, a type of processor has been developed called a circular convolver or circular correlator. In such a device, one set of values is usually coupled to one set of multipliers' input terminals in a fixed configuration and the other set of values is applied to the other input terminals of successive multipliers in a cyclic manner. The product values from the multipliers are summed to produce the successive values of correlation or convolution. The order of the values determines whether the circuit is a convolver or a correlator.

Early circular correlators/convolvers used 2N multipliers and 2N−1 delay stages to produce N-point sampled signals. Later improvements reduced the number of delay stages and multipliers, but increased the complexity of the multipliers because two second input terminals were required.

Recirculating the second set of values through a reduced number of delay stages also reduced the number of delay stages and multipliers without adding to the multiplier complexity, but required complex timing circuitry to control the data routing in the system.

A convolver or correlator embodying the invention has an input means for supplying first input signals at a predetermined rate r and shift signal source means for supplying shift signals at the predetermind rate r. A first shift register means capable of serial input and parallel output has a plurality of at least n stages and receives the first input signals in serial manner, shifting them from stage to stage in response to the shift signals. A second shift register means capable of both serial and parallel input and parallel output has a plurality of n stages which receives, in parallel manner, the contents of the n stages of the first shift register means each time the first register means receives a successive group of n input signals. The parallel transfer of the contents of the first shift register to the second shift register is effected by transfer means such as transmission gates which are enabled each time the first shift register receives a group of n input signals. There is further supplied a rotate signal means coupled to the second shift register for rotating the input signals from stage to stage at approximately the predetermined rate, a plurality of multipliers coupled to receive as input operands the first input signal from a correspondig one of the stages of the second shift register and second input signals for producing product signals representative of the value of the corresponding first input signal times the value of the corresponding second input signal, and summing means responsive to the product signals from the plurality of multiplier means for producing output signals.

Figure 2:
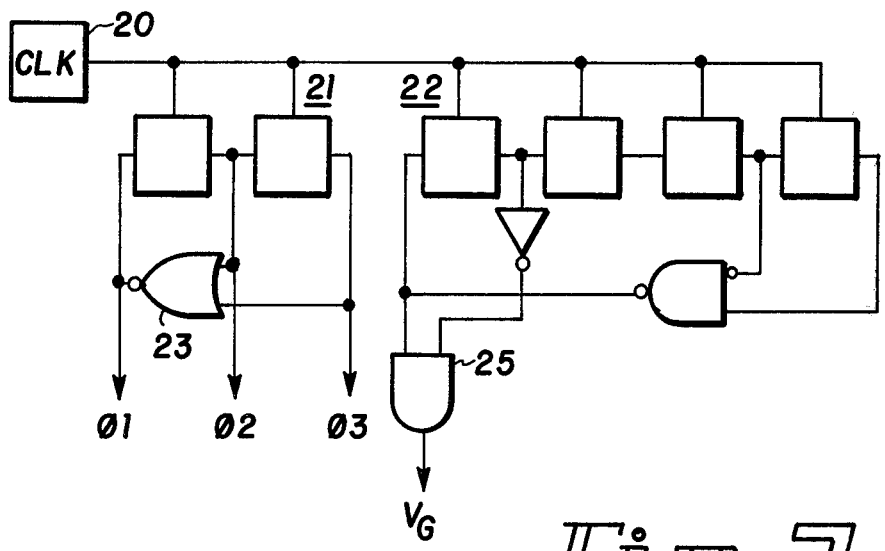
FIG. 2 is a logic diagram of the timing pulse generator suitable for use with the embodiment of the invention shown in FIG. 1.
Figure 4:
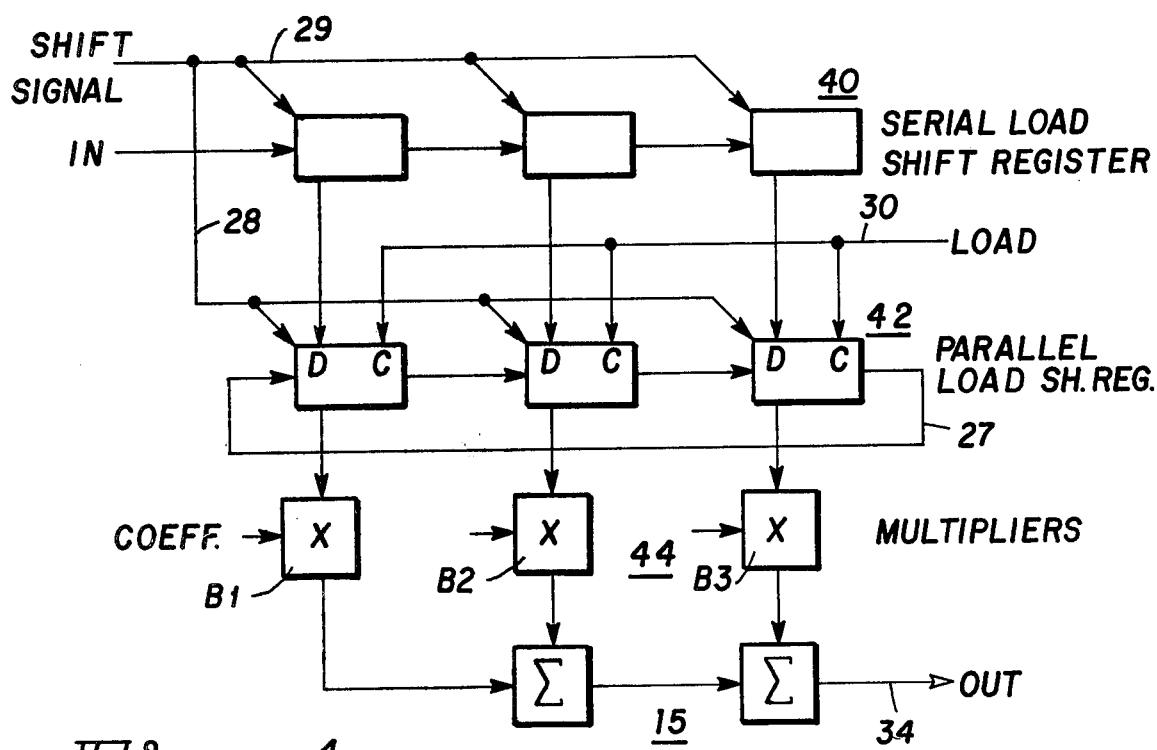
Figure 5:
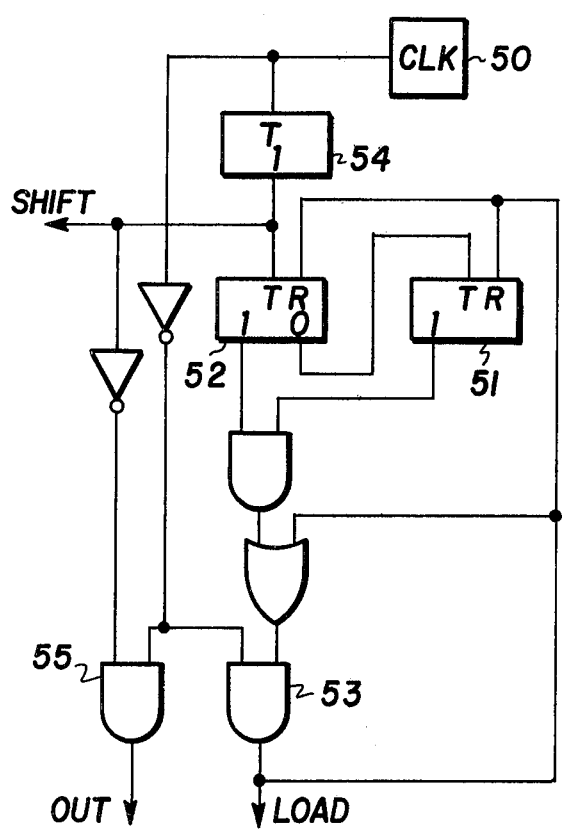

FIGS. 3(a)-3(e) are timing diagrams showing the relative waveforms of various signals in the circuit of FIG. 2;

FIG. 4 is a logic diagram of an embodiment of the invention utilizing discrete components;

FIG. 5 is a logic diagram of a timing circuit useful with the circuit of FIG. 4; and FIGS. 6(a)-6(f) are illustrations of waveforms at various points in the circuit of FIG. 5.

Figure 1:
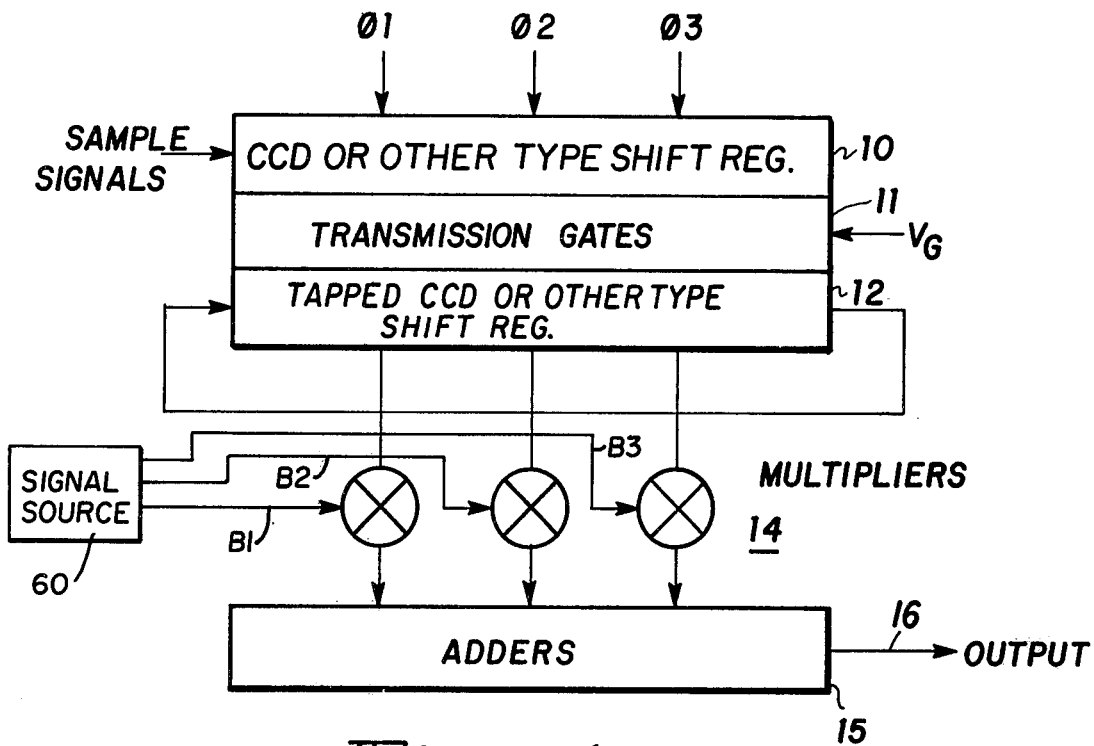
FIG. 1 is a block diagram of a preferred embodiment of the invention.

The block diagram of FIG. 1 illustrates an embodiment of the invention which can employ conventional shift registers or shift registers employing charge coupled device (CCD) technology, which is well known in the art. An input section comprises a shift register 10, which can be a CCD type shift register or another suitable type shift register, a plurality of transmission gates 11, and a tapped CCD or other suitable type shift register 12. The output signals from the parallel output taps of the tapped shift register 12 are coupled to one input of a plurality of multipliers 14, having a second input operand signals B1-B3. Said operand signals B1-B3 are supplied from an appropriate signal source 60, in a manner well known in the art. A summing circuit which can be a plurality of adders 15 sums the output signals from the multipliers 14 to provide the output signals. Sample signals are shifted into the CCD shift register 10 using a three-phase clock, $\phi 1$, $\phi 2$, and $\phi 3$. Such CCD shift registers are well known in the art and need not be described in detail. When the sample signals for one cycle have been loaded into the shift register 10—in this example, three sample signals—the transmission gates 11 are activated by a signal $V_G$ to transfer the contents of the CCD shift register 10 into the parallel output ports of tapped CCD shift register 12. The shift register 12 also has its output terminal coupled to its input terminal so that the three-phase clock input signal shifts the contents of the tapped CCD shift register 12 in a rotational manner, i.e., the output signal cycles back to the input stage. While the contents of the tapped CCD shift register 12 are circulating, the next set of sample signals is being shifted into the CCD shift register 10. The interconnection of the devices 10, 11 and 12 will be described below in terms of discrete components.

The advantage of the circuit of FIG. 1 is that the sample signals can be stored and processed continuously in real time. Rotating the input sample values in a separate shift register 12 allows the circular convolutions or correlation values to be continuously calculated and supplied at the output signal terminal 16 while the next group of samples is being stored in shift register 10.

Figure 3:
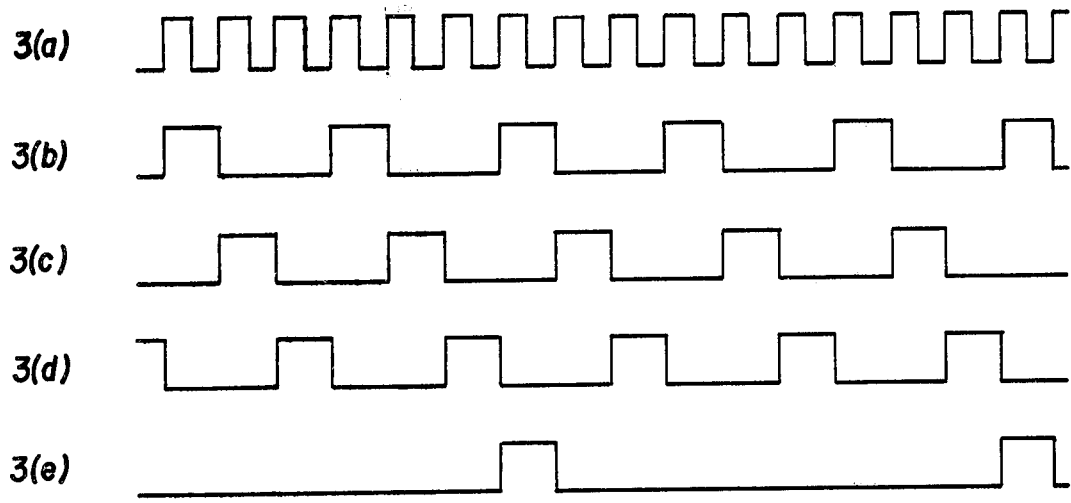

The logic diagram of FIG. 2 shows a suitable clocking circuit for providing the three-phase clock and the gating signal $V_G$ to the circuit of FIG. 1. The operation of the circuit of FIG. 2 can be better understood with reference to FIG. 3. A clock source 20 supplies a basic pulse train such as shown in FIG. 3(a), which drives two groups of shift registers 21 and 22. The output signals from the two shift registers in the group of shift registers 21 supplies input signals to a NOR gate 23 which produces an output signal when both shift registers are reset. When either shift register is set, the NOR gate 23 is inactivated. The output signal from the NOR gate 23 is shifted into the first of the shift registers of the group 21, thence to the second and, at the third shift signal, the group of shift registers 21 is reset to zero (by logic not specifically shown in FIG. 4) producing an output signal at the output of the NOR gate 23. FIGS. 3(b), 3(c), and 3(d) represent the output signals $\phi 1$, $\phi 2$ and $\phi 3$ from the NOR gate 23, and the first and second shift registers of the group 21, respectively. The shift registers 22 are coupled as a modified Johnson counter producing an output signal every ninth output pulse from the clock 20. In this example, an output signal $V_G$ from an AND gate 25 indicates that a complete set of sample signals, that is, three sample signals have been stored and are to be gated to the rotating shift register 12 of FIG. 1. The output signal from the AND gate 25 is shown in FIG. 3(e).

FIG. 4 is a logic diagram of the invention shown in discrete components. Two groups of shift registers 40 and 42 advance by a shift signal applied to each individual stage via leads 28 and 29. The input signals shifted into the stages of the first shift register 40, via a signal LOAD on lead 30 are gated into the second shift register 42, the stages of which can be implemented with D-type flip-flops. The output signals from the shift register 42 are applied via the multipliers 44 to the adders 15 to produce the output signal. The coefficients, B1, B2 and B3, in the case of convolvers, or the second input signals, in the case of correlators, are coupled to the other input of each of the multipliers 44.

Figure 6:
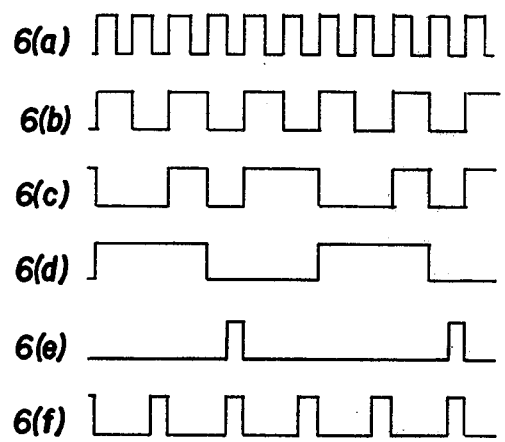

The circuit of FIG. 5 is a timing circuit suitable for use with the circuit of FIG. 4. A modified scale-of-four counter using two flip-flops 51 and 52 is driven by a clock signal from a clock source 50. The output signal from this source is divided by two by a triggerable flip-flop 54. The output signal from the flip-flop 54 is the shift signal which can drive both shift registers shown in FIG. 4. After three shift signals, when the samples of the cycle are loaded in the shift register 40 (FIG. 4), the output signal from an AND gate 53 produces the load signal which gates the contents of the shift register 40 into the shift register 42. The second AND gate 55 produces an output timing clock for the result signals from the adders 15. FIG. 6(a) shows the output from the clock circuit 50, FIG. 6(b) shows the output signal from the divide-by-two flip-flop 54, and FIGS. 6(c) and 6(d) represent the set output signals from the flip-flops 52 and 51, respectively. The load output signal from the AND gate 53 is shown in FIG. 6(e) and the output clock from the AND gate 55 is shown in FIG. 6(f). The shift signals driving the shift registers are those shown in FIG. 6(b).

The circuits of FIG. 1 and FIG. 4. embodying the invention show how an auxiliary shift register for rotating the input samples permits continuous processing of the samples by rotating the one cycle of n input values through the multipliers while the second cycle of n input values is being loaded in the first shift register. Except for an initial delay of loading the first samples, the output signals from a convolver or correlator according to the invention are provided on a continuous and real time basis.

In the circuit of FIG. 4, the multipliers 44 can be replaced by weighting resistors having a value dependent on the coefficient (B1-B3) coupled thereto and the adder 15 can be replaced by an operational amplifier summing circuit using suitable feedback impedance to provide the desired scaling factor. This would, of course, provide an analog output signal. The use of shift registers of the CCD type, however, cannot use weighting resistors as advantageously as the circuit of FIG. 4. Weighting the output signal of a CCD shift register by splitting the electrodes, however, is well known in the art. See, for example, U.S. Pat. No. 3,819,958.

What is claimed is:

1. A digital convolver/correlator comprising, in combination:
    input means for supplying first input signals at a predetermined rate;
    signal source means for supplying first shift signals at said predetermined rate;
    serial in and parallel out first shift register means having a plurality of at least n first stages for receiving the first input signals and serially shifting said first input signals from stage to stage in response to said first shift signals;
    transfer signal means for producing a transfer signal each time said first shift register means has received n input signals;
    serial and parallel in and parallel out second shift register means having a plurality of n second stages with the signal output terminal of its final stage coupled to the signal input terminal of its first stage for enabling rotation of said first input signals through said second stages thereof;
    transmission means responsive to said transfer signal for transferring the said first input signals in parallel manner from the stages of said first shift register means to corresponding stages of said second shift register means;
    said signal source means constructed to supply to said second shift register means second shift signals for rotating the input signals from stage to stage therein at a rate not less than approximately said predetermined rate;
    means providing a plurality of second input signals;
    a plurality of multiplier means, each coupled to receive as a first input operand the first input signal from a different stage of said second shift register means and as a second input operand one of said second input signals to produce a product signal representative of the value of the first input signal applied thereto times the value of the second input signal applied thereto; and
    summing means responsive to the product signals from said plurality of multiplier means for producing output signals.
2. The invention as claimed in claim 1 wherein said first and second shift register means comprise charge coupled device shift register means.

* * * * *

UNITED STATES PATENT AND TRADEMARK OFFICE
CERTIFICATE OF CORRECTION

PATENT NO. : 4,161,033

DATED : July 10, 1979

INVENTOR(S): Lloyd William Martinson

It is certified that error appears in the above-identified patent and that said Letters Patent is hereby corrected as shown below:

In the Abstract, line 6, change "shfit" to -- shift --;
line 7, change "multipliers," to -- multi-pliers. --;
Column 2, line 1, change "h(n)τ" to -- h(nτ) --;
Column 3, line 30, change "correspondig" to -- corresponding --;
line 63, change "operand signals" to -- signal operand --.

Signed and Sealed this

Seventeenth Day of June 1980

[SEAL]

Attest:

SIDNEY A. DIAMOND

Attesting Officer   Commissioner of Patents and Trademarks